(12) United States Patent  
Sharma

(10) Patent No.: US 9,403,557 B1  
(45) Date of Patent: Aug. 2, 2016

(54) BREAKAWAY VEHICLE FENDER DEVICE

(71) Applicant: Manoj Sharma, Rensselaer, IN (US)

(72) Inventor: Manoj Sharma, Rensselaer, IN (US)

( * ) Notice: Subject to any disclaimer, the term of this patent is extended or adjusted under 35 U.S.C. 154(b) by 8 days.

(21) Appl. No.: 14/563,684

(22) Filed: Dec. 8, 2014

(51) Int. Cl.
| | |
|---|---|
| *B60N 99/00* | (2006.01) |
| *B62D 25/02* | (2006.01) |
| *B62D 65/02* | (2006.01) |
| *C21D 1/06* | (2006.01) |
| *B23K 15/00* | (2006.01) |
| *B23K 26/20* | (2014.01) |
| *B23K 26/36* | (2014.01) |

(52) U.S. Cl.
CPC ............ *B62D 25/02* (2013.01); *B23K 15/0046* (2013.01); *B23K 26/20* (2013.01); *B23K 26/36* (2013.01); *B62D 65/02* (2013.01); *C21D 1/06* (2013.01)

(58) Field of Classification Search
CPC .... B62D 25/02; B62D 65/02; B23K 15/0046; B23K 26/36; B23K 65/02; C21D 1/06
See application file for complete search history.

(56) References Cited

U.S. PATENT DOCUMENTS

| | | |
|---|---|---|
| 3,831,997 A | 8/1974 | Myers |
| 3,909,058 A | 9/1975 | Kramer et al. |
| 5,125,715 A | 6/1992 | Kijima |

*Primary Examiner* — Lori L Lyjak
(74) *Attorney, Agent, or Firm* — Crossley and Stevenson Intellectual Property Law

(57) ABSTRACT

A breakaway vehicle fender device including a fender frame having an outer fender frame portion and a frangible inner fender frame portion disposed at an overlap and joined at a welded joint. The inner fender frame portion includes a heat treated inner section and a non-heat treated circumferential outer edge. The inner fender frame portion includes a plurality of breakaway crevices disposed in a vertically oriented row. The inner fender frame portion is disposed between a vehicle door and the outer fender frame portion and is configured to bend or fracture in response to a force by a user upon the vehicle door.

12 Claims, 3 Drawing Sheets

BREAKAWAY VEHICLE FENDER DEVICE

BACKGROUND OF THE INVENTION

Vehicle fenders serve several different functions including increasing aesthetics of the vehicle, providing improved aerodynamics, and impact absorption in the event of a vehicle collision. It is generally observed that during a frontal collision, the vehicle fender will invariably move inwards towards a vehicle door. This can create an obstruction of the vehicle door, preventing the door from opening and stopping injured occupants from being able to safely and timely exit the vehicle. This problem puts not only the vehicle occupants at risk, but also those of rescue workers, who must face the dangers created by the vehicle collision to pry the vehicle door open and rescue the occupants.

Thus, what is needed is a breakaway vehicle fender device having a frangible inner fender frame portion and an outer fender frame portion. The inner fender frame portion is disposed between the outer fender frame portion and the vehicle door. The inner fender frame portion composed of heat treated mild steel, rendering it strong, yet brittle in response to a strong force. Additionally, the inner fender frame portion includes a plurality of breakaway crevices carved with a carbon dioxide laser. These breakaway crevices are designed to give, in that they bend or fracture in response to vehicle collision, either fracturing the inner fender frame portion, or providing a point of flex so that the vehicle door can be easily pried open or pushed open from the inside of the vehicle. The inner fender frame portion flexes at the location of the breakaway crevices, while the vehicle door acts as a lever, and a vehicle door hinge acts as a fulcrum. Thus, a vehicle occupant trapped inside the vehicle has leverage to bend the inner fender frame portion at the location of the breakaway crevices. Finally, the inner fender frame portion and the outer fender frame portion are welded together at a welded joint that is configured to fracture in response to a vehicle collision or a user force, thus, offering another area of breakage for vehicle occupants to target in an effort to free themselves from an obstructed vehicle door.

FIELD OF THE INVENTION

The present invention relates to vehicle fender, and more particularly, to a breakaway vehicle fender device and method of manufacturing the breakaway vehicle fender device for improving the safety of a vehicle.

SUMMARY OF THE INVENTION

The general purpose of the present breakaway vehicle fender device, described subsequently in greater detail, is to provide a breakaway vehicle fender device which has many novel features that result in a breakaway vehicle fender device which is not anticipated, rendered obvious, suggested, or even implied by prior art, either alone or in combination thereof.

The invention seeks to protect passengers, especially front seat occupants by modifying the fender strength at the end adjoining the front door. The idea is proposed to be implemented by modification of the fender design, dividing it into two parts. One portion is composed of normal fender material, for example mild steel. The second portion is also mild steel, but is heat treated in such a manner so as to make it brittle.

It is well known that steel is very strong in some treatments and weak and bendable in others. This is because of the manner in which metal atoms bond with each other. Heat treatment is one of the processes which strengthens the metal by promoting the formation of dislocation knots. On heating steel, a plurality of dislocations are formed. On abrupt cooling of the metal, these dislocations are trapped in a knot which hinders further movement of atoms, thereby strengthening the metal but also making it brittle.

In case of direct frontal collision, when the vehicle fender pushes into the cockpit outer frame adjoining the front door, and the brittle portion is configured to collapse, break or snap. In this manner, occupants trapped inside the vehicle cockpit during a frontal collision can break through the impeding vehicle fender, opening the door and freeing themselves from the crashed vehicle.

The present device comprises a vehicle having a fender frame. The fender frame includes both an outer fender frame portion and a frangible inner fender frame portion. Each of the inner fender frame portion and the outer fender frame portion are composed of a mild steel. The outer fender frame portion has an inner portion and an outer portion. The inner fender frame portion has an inner face and an outer face. Each of the outer face of the inner fender frame portion and the inner portion of the outer fender frame portion have an overlap, wherein the outer face and the inner portion rest flushly against each other.

The inner fender frame portion includes an inner section and a circumferential outer edge. The inner section is composed of a heat treated frangible mild steel, while the circumferential outer edge is composed of a non-heat treated mild steel. Because the circumferential outer edge is non-heat treated, it is soft and therefore conducive to welding. It is envisioned that the heat treatment includes case hardening through carbonitriding heat treatment. The circumferential outer edge is protected from the carbonitriding heat treatment. Heat treatment of the inner section strengthens the mild steel of the inner section, but also renders it brittle in response to an abrupt force.

Each of the outer fender frame portion and the inner fender frame portion are joined at a welded joint. The welded joint is configured to be frangible depending on the type of welding method selected, the type of work materials, and filler materials used. Each of the outer face of the inner fender frame portion and the inner portion of the outer fender frame portion have an overlap proximal the welded joint, wherein the outer face and the inner portion rest flushly against each other.

The inner fender frame portion has a thickness of approximately twenty-five percent less than a thickness of the outer fender frame portion. In the preferred embodiment, the inner fender frame portion has a thickness of approximately 1.5 millimeters (mm), while the outer fender frame portion has a thickness of approximately 2.0 mm.

The inner fender frame portion includes a plurality of breakaway crevices aligned in a row. It is envisioned that the plurality of breakaway crevices can be disposed upon the inner face and alternately can be disposed upon the outer face. In the preferred embodiment the plurality of breakaway crevices are vertically oriented the row spaced at about 15 mm apart, however other alignments are envisioned that would not deviate from the scope of the invention. Each of the respective breakaway crevices has a depth of approximately equivalent to fifty percent of a thickness of the inner fender frame portion. Therefore, if the inner fender frame portion has a uniform thickness of approximately 1.5 mm, then the depth of each respective breakaway crevice is approximately 0.75 mm. The first inner fender frame portion is configured to bend at each of the respective breakaway crevices, and in the case of a significant force upon the fender frame, is configured to fracture.

Upon a collision of the fender frame of the vehicle, the fender frame is configured to be frangible or bendable at select target points to enable quick removal of any portion of the fender frame which may hinder opening of a vehicle door and obstruct access to a passenger compartment of the vehicle. A first target point is at the frangible inner fender frame portion, wherein the brittle mild steel of the inner section of the inner fender frame portion is configured to fracture. The second target point is at the plurality of breakaway crevices. The inner fender frame portion is configured flex or fracture along the plurality of breakaway crevices, depending on the strength of the force imparted upon it. Finally, the third target point is at the welded joint, which is configured to fracture allowing the dissociation of the overlap of the inner fender frame from the outer fender frame.

Finally, a method of manufacture is envisioned comprising forming the inner fender frame portion out of a single sheet of mild steel, the inner fender frame portion having the inner section and the circumferential outer edge; protecting the circumferential outer edge from carbonitriding heat treatment; case hardening the inner section of the inner fender frame portion through a carbonitriding heat treatment; forming the outer fender frame portion out of a single sheet of mild steel; welding the circumferential outer edge to the outer fender frame portion at the welded joint, thus, forming the fender frame through the welding process; creating the plurality of vertically oriented breakaway crevices in the inner fender frame portion; grinding the welded joint continuously smooth with each of the inner fender frame portion and the outer fender frame portion; surface finishing the fender frame with an automotive paint or coating; and assembling the fender frame onto a frame of the vehicle, wherein the inner fender frame portion is disposed between the vehicle door of the vehicle and the outer fender frame portion. It is envisioned that the welding process is an E-beam welding process, and alternately is a laser welding process, although, other low heat welding processes should be considered within the spirit and scope of the invention. Additionally, it is envisioned that the vertically oriented breakaway crevices in the inner fender frame portion are created by removing approximately fifty percent of the thickness of the inner fender frame portion at the respective breakaway crevices with a carbon dioxide laser.

Thus has been broadly outlined the more important features of the present breakaway vehicle fender device so that the detailed description thereof that follows may be better understood and in order that the present contribution to the art may be better appreciated.

Numerous objects, features and advantages of the present breakaway vehicle fender device will be readily apparent to those of ordinary skill in the art upon reading the following detailed description of presently preferred, but nonetheless illustrative, examples of the present breakaway vehicle fender device when taken in conjunction with the accompanying drawings.

BRIEF DESCRIPTION OF THE DRAWINGS

Figures

DETAILED DESCRIPTION OF THE DRAWINGS

Figure 1:
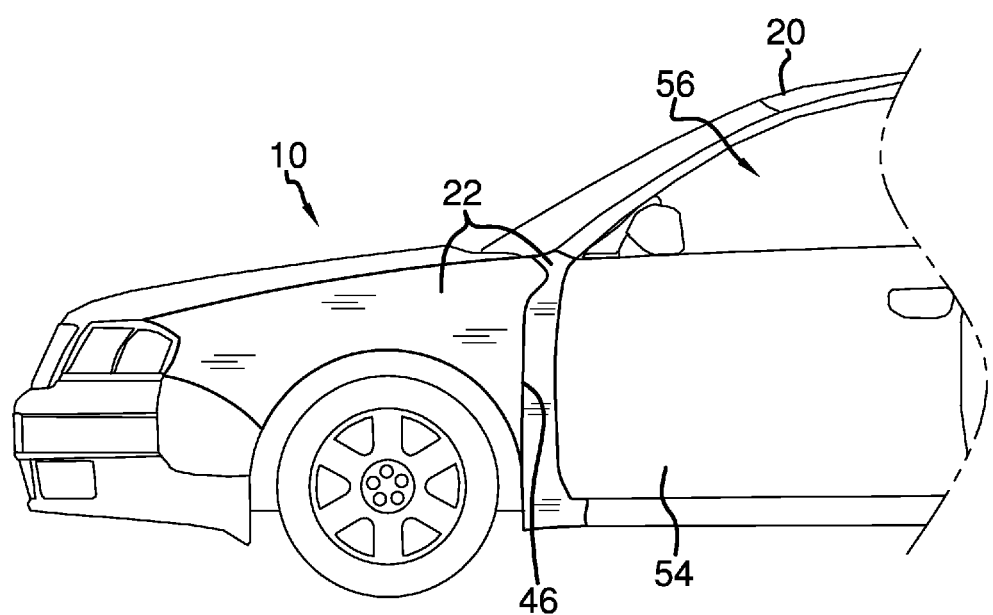
FIG. 1 is a frontal view of the device in use.
Figure 3:
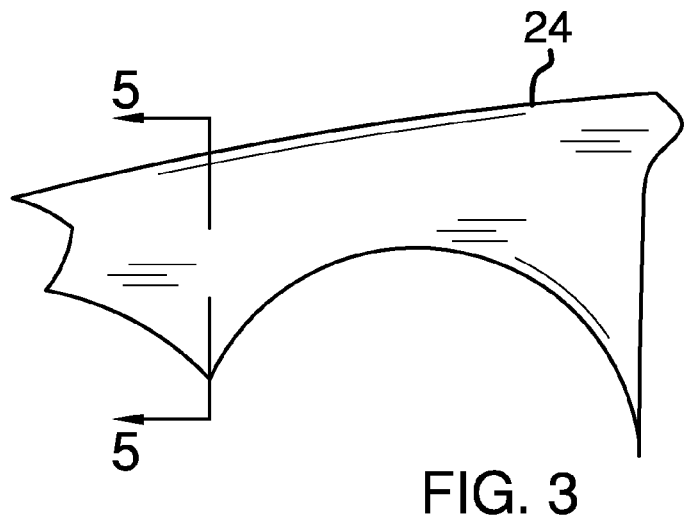
FIG. 3 is a detail view of the outer fender frame portion.
Figure 2:
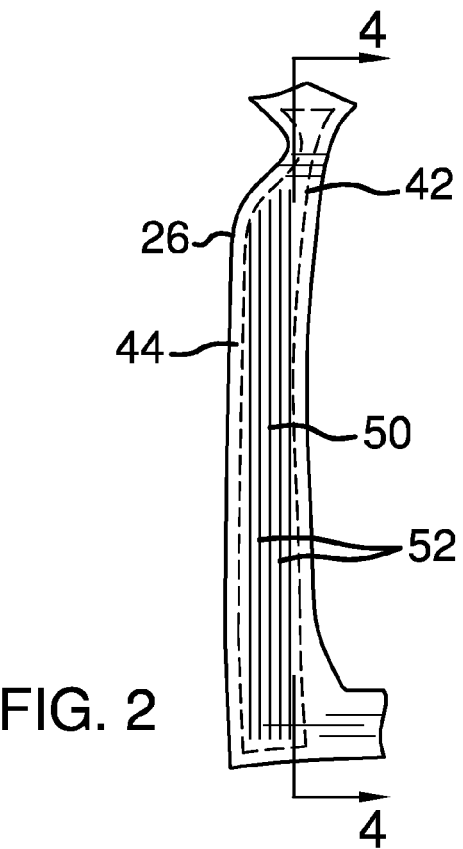
FIG. 2 is a detail view of the inner fender frame portion.
Figure 4:
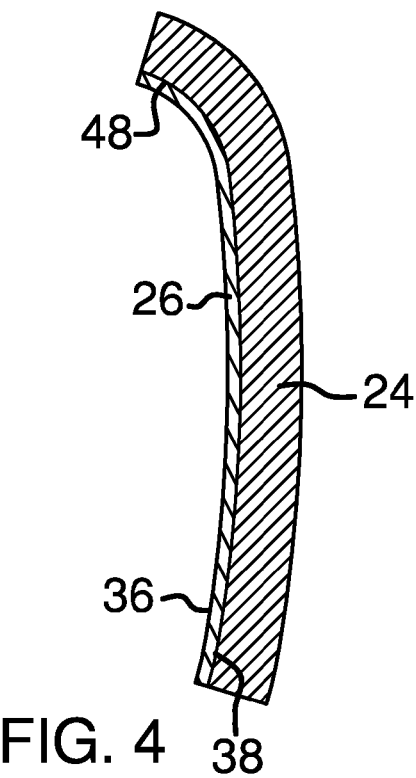
FIG. 4 is a cross-sectional view.
Figure 5:
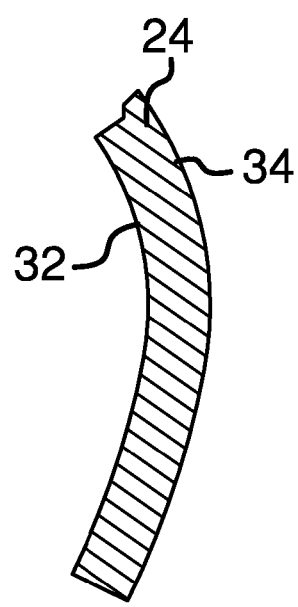
FIG. 5 is a cross-sectional view.

With reference now to the drawings, and in particular FIGS. 1 through 5 thereof, the instant breakaway vehicle fender device employing the principles and concepts of the present breakaway vehicle fender device and generally designated by the reference number 10 will be described.

Referring to FIGS. 1 through 5 a preferred embodiment of the present breakaway vehicle fender device 10 is illustrated. The device 10 comprises a fender frame 22 attached to a vehicle 20. The fender frame 22 includes both an outer fender frame portion 24 and a frangible inner fender frame portion 26. Each of the inner fender frame portion 26 and the outer fender frame portion 24 are composed of a mild steel. The outer fender frame portion 24 has an inner portion 32 and an outer portion 34. The inner fender frame portion 26 has an inner face 36 and an outer face 38.

The inner fender frame portion 26 includes an inner section 42 and a circumferential outer edge 44. The inner section 42 is composed of a heat treated frangible mild steel, while the circumferential outer edge 44 is composed of a non-heat treated mild steel. Because the circumferential outer edge 44 is non-heat treated, it is soft and therefore conducive to welding. It is envisioned that the heat treatment includes case hardening through carbonitriding heat treatment. The circumferential outer edge 44 is protected from the carbonitriding heat treatment through many different methods, including the placement of case hardening salts. Heat treatment of the inner section 42 strengthens the mild steel of the inner section 42, but also renders it brittle in response to an abrupt force.

Each of the outer fender frame portion 24 and the inner fender frame portion 26 are joined at a welded joint 46. The welded joint 46 is configured to be frangible depending on the type of welding method selected, the type of work materials, and filler materials used. Each of the outer face 38 of the inner fender frame portion 26 and the inner portion 32 of the outer fender frame portion 24 have an overlap 48 proximal the welded joint 46, wherein the outer face 38 and the inner portion 32 rest flushly against each other.

The inner fender frame portion 26 has a thickness of approximately twenty-five percent less than a thickness of the outer fender frame portion 24, rendering it more conducive to fracturing. In the preferred embodiment, the inner fender frame portion 26 has a thickness of approximately 1.5 millimeters (mm), while the outer fender frame portion 24 has a thickness of approximately 2.0 mm.

The inner fender frame portion 26 includes a plurality of breakaway crevices 50 aligned in a row 52. It is envisioned that the plurality of breakaway crevices 50 can be disposed upon the inner face 36 and alternately can be disposed upon the outer face 38. In the preferred embodiment the plurality of breakaway crevices 50 are vertically oriented the row 52, however other alignments are envisioned that would not deviate from the scope of the invention. Each of the respective breakaway crevices 50 has a depth of approximately equivalent to fifty percent of a thickness of the inner fender frame portion 26. Therefore, if the inner fender frame portion 26 has a uniform thickness of approximately 1.5 mm, then the depth of each respective breakaway crevice 50 is approximately 0.75 mm. The first inner fender frame portion 26 is configured to bend at each of the respective breakaway crevices 50 upon a force by a user, and in the case of a significant force by a user, is configured to fracture.

The fender frame 22 of the vehicle 20 is configured to be frangible or bendable at select target points to enable quick removal of any portion of the fender frame which may hinder opening of a vehicle door 54 and obstruct access to a passenger compartment 56 of the vehicle 20. A first target point is at the frangible inner fender frame portion 26, wherein the brittle mild steel of the inner section 42 of the inner fender frame portion 26 is configured to fracture upon an impact of the fender frame 22, and alternately, upon a force by a user. The second target point is at the plurality of breakaway crevices 50. The inner fender frame portion 26 is configured flex or fracture along the plurality of breakaway crevices 50, depending on the strength of the force acted upon it, either by a user or by a vehicle impact. Finally, the third target point is at the welded joint 46, which is configured to fracture allowing the dissociation of the overlap of the inner fender frame from the outer fender frame.

Finally, a method of manufacture is envisioned comprising forming the inner fender frame portion 26 out of a single sheet of mild steel, the inner fender frame portion 26 having the inner section 42 and the circumferential outer edge 44; protecting the circumferential outer edge 44 from carbonitriding heat treatment; case hardening the inner section 42 of the inner fender frame portion 26 through a carbonitriding heat treatment; forming the outer fender frame portion 24 out of a single sheet of mild steel; welding the circumferential outer edge 44 to the outer fender frame portion 24 at the welded joint 46, thus, forming the fender frame 22 through the welding process; creating the plurality of vertically oriented breakaway crevices 50 in the inner fender frame portion 24; grinding the welded joint 46 continuously smooth with each of the inner fender frame portion 26 and the outer fender frame portion 24; surface finishing the fender frame 22 with an automotive paint or coating; and assembling the fender frame 22 onto a frame of the vehicle 20, wherein the inner fender frame portion 26 is disposed between the vehicle door 54 of the vehicle 20 and the outer fender frame portion 24. It is envisioned that the welding process is an E-beam welding process, and alternately is a laser welding process, although, other low heat welding processes should be considered within the spirit and scope of the invention. Additionally, it is envisioned that the vertically oriented breakaway crevices 50 in the inner fender frame portion 26 are created by removing approximately fifty percent of the thickness of the inner fender frame portion at the respective breakaway crevices 50 with a carbon dioxide laser.

What is claimed is:

1. A breakaway vehicle fender device comprising:
   a fender frame having an outer fender frame portion and a frangible inner fender frame portion; the inner fender frame portion configured to breakaway from the outer fender frame portion upon a force by a user.

2. The breakaway vehicle fender device of claim 1 further comprising:
   a plurality of vertically oriented breakaway crevices aligned in a row and disposed upon the inner fender frame portion, wherein each of the breakaway crevices has a depth approximately equivalent to fifty percent of a thickness of the inner fender frame portion;
   wherein the first inner fender frame portion is configured to fold at each of the respective breakaway crevices upon a force by a user.

3. The breakaway vehicle fender device of claim 1 wherein each of the outer fender frame portion and the inner fender frame portion are joined at a welded joint.

4. The breakaway vehicle fender device of claim 3 wherein each of the inner fender frame portion and the outer fender frame portion are composed of a mild steel;
   the inner fender frame portion including an inner section and a circumferential outer edge;
   wherein the inner section is composed of a heat treated frangible mild steel, and the circumferential outer edge is composed of a non-heat treated mild steel.

5. The breakaway vehicle fender device of claim 3 wherein the welded joint is frangible.

6. The breakaway vehicle fender device of claim 3 further comprising:
   a plurality of vertically oriented breakaway crevices aligned in a row and disposed upon the inner fender frame portion, wherein each of the breakaway crevices has a depth approximately equivalent to fifty percent of a thickness of the inner fender frame portion;
   wherein the first inner fender frame portion is configured to fold at each of the respective breakaway crevices.

7. The breakaway vehicle fender device of claim 4 further comprising:
   a plurality of vertically oriented breakaway crevices aligned in a row and disposed upon the inner fender frame portion, wherein each of the breakaway crevices has a depth approximately equivalent to fifty percent of a thickness of the inner fender frame portion;
   wherein the first inner fender frame portion is configured to fold at each of the respective breakaway crevices.

8. The breakaway vehicle fender device of claim 4 further wherein the welded joint is configured to be frangible.

9. The breakaway vehicle fender device of claim 4 wherein the inner fender frame portion has a thickness of approximately twenty-five percent less than a thickness of the outer frame portion.

10. The breakaway vehicle fender device of claim 7 wherein the welded joint is configured to be frangible.

11. The breakaway vehicle fender device of claim 10 wherein the inner fender frame portion has a thickness of approximately twenty-five percent less than a thickness of the outer frame portion.

12. A breakaway vehicle fender device comprising:
    a vehicle having a fender frame, the fender frame having an outer fender frame portion and a frangible inner fender frame portion, each of the outer fender frame portion and the inner fender frame portion joined at a welded joint, the inner fender frame portion including an inner section and a circumferential outer edge, each of the inner fender frame portion and the outer fender frame portion composed of a mild steel, the inner section composed of a heat treated frangible mild steel, and the circumferential outer edge composed of a non-heat treated mild steel;
    wherein the welded joint is configured to be frangible;
    wherein the inner fender frame portion has a thickness of approximately twenty-five percent less than a thickness of the outer fender frame portion;
    a plurality of vertically oriented breakaway crevices aligned in a row and disposed upon the inner fender frame portion, wherein each of the breakaway crevices has a depth approximately equivalent to fifty percent of a thickness of the inner fender frame portion;
    wherein the first inner fender frame portion is configured to bend at each of the respective breakaway crevices upon a force by a user;
    wherein the inner section of the inner fender frame portion is configured to fracture upon a force by a user.

* * * * *